(12) United States Patent
Noji

(10) Patent No.: US 10,396,638 B2
(45) Date of Patent: Aug. 27, 2019

(54) STATOR MANUFACTURING APPARATUS AND STATOR MANUFACTURING METHOD

(71) Applicant: NITTOKU ENGINEERING CO., LTD., Saitama-shi, Saitama (JP)

(72) Inventor: Kaoru Noji, Fukushima (JP)

(73) Assignee: NITTOKU ENGINEERING CO., LTD., Saitama-Shi, Saitama (JP)

( * ) Notice: Subject to any disclaimer, the term of this patent is extended or adjusted under 35 U.S.C. 154(b) by 280 days.

(21) Appl. No.: 15/302,041

(22) PCT Filed: Apr. 28, 2015

(86) PCT No.: PCT/JP2015/062861
§ 371 (c)(1),
(2) Date: Oct. 5, 2016

(87) PCT Pub. No.: WO2015/178181
PCT Pub. Date: Nov. 26, 2015

(65) Prior Publication Data
US 2017/0187269 A1    Jun. 29, 2017

(30) Foreign Application Priority Data

May 20, 2014    (JP) .................................. 2014-103960

(51) Int. Cl.
*H02K 15/06*  (2006.01)
*H02K 3/12*   (2006.01)
(Continued)

(52) U.S. Cl.
CPC ........... *H02K 15/0031* (2013.01); *H02K 3/12* (2013.01); *H02K 15/066* (2013.01);
(Continued)

(58) Field of Classification Search
CPC ....... H02K 15/066; H02K 15/085; H02K 3/12
See application file for complete search history.

(56) References Cited

U.S. PATENT DOCUMENTS 6,223,784 B1     5/2001 Kirschner
2007/0261229 A1* 11/2007 Yamaguchi .......... H02K 15/066
                                                29/596
(Continued)

FOREIGN PATENT DOCUMENTS

JP    2001-513320 A    8/2001
JP    2004-248434 A    9/2004
(Continued)

*Primary Examiner* — Livius R. Cazan
(74) *Attorney, Agent, or Firm* — Rabin & Berdo, P.C.

(57) ABSTRACT

A stator manufacturing apparatus includes an insertion tool inserted into a stator core, the insertion tool having a plurality of holding grooves formed on an outer periphery, the insertion tool being configured such that a pair of side portions of a stator coil are disposed in two of the holding grooves separated by a predetermined width; and a pressing tool having a plurality of plate-like pushers narrowed toward tips arranged on a pressing body in correspondence with the positions of the plurality of holding grooves of the insertion tool. The pressing tool is configured to push the pairs of side portions of the stator coils inserted in the holding grooves radially outwardly and insert the side portions into the corresponding slots. A recessed groove enabling grippers to be inserted when the stator coil is disposed using the grippers for gripping the pair of side portions is formed on the outer periphery of the insertion tool.

6 Claims, 10 Drawing Sheets

(51) Int. Cl.
*H02K 15/00* (2006.01)
*H02K 15/085* (2006.01)

(52) U.S. Cl.
CPC ...... *H02K 15/085* (2013.01); *Y10T 29/49009* (2015.01); *Y10T 29/53143* (2015.01)

(56) References Cited

U.S. PATENT DOCUMENTS

2013/0000105 A1    1/2013   Hasegawa et al.
2014/0201979 A1*   7/2014   Yamaguchi .......... H02K 15/066
                                                                                29/596

FOREIGN PATENT DOCUMENTS

| JP | 2005-218164 A | 8/2005 |
| JP | 2007-166849 A | 6/2007 |
| JP | 2011-193597 A | 9/2011 |

* cited by examiner

STATOR MANUFACTURING APPARATUS AND STATOR MANUFACTURING METHOD

TECHNICAL FIELD

The present invention relates to a stator manufacturing apparatus and a stator manufacturing method.

BACKGROUND ART

Conventionally, a stator of a rotating electric machine includes a cylindrical stator core and stator coils. The stator core includes a plurality of teeth (magnetic poles) radially arranged and projecting radially inwardly and a plurality of slots open between the teeth. The stator coils are mounted on the stator core by housing a coil side portion into each slot.

A so-called inserter method (see, for example, JP2001-513320A) is known concerning this mounting of stator coils. In the inserter method, stator coils are fabricated in advance separately from a stator core and these stator coils are mounted into each slot of the stator core using an inserter device.

In this inserter method, the stator coils are mounted by pulling up the stator coils by a push-up shaft of the inserter device and moving these stator coils upwardly while pushing the stator coils into the slots of the stator core. After the mounting of the stator coils, the stator coils are wound around separate slots parallel to an axial direction of the stator core.

Parts of the stator coils housed in the slots between the teeth constitutes stator coil side portions and the remaining parts not inserted into the slots of the stator coil constitute coil end portions projecting from an end surface of the stator core.

Here, the coil end portions need to be located on the upper surface of the push-up shaft of the unillustrated inserter device when the mounting of the stator coils is completed. Thus, in this inserter method, the size of the stator coils is set such that the coil end portions are located on the upper surface of the unillustrated push-up shaft when the mounting of the coils is completed.

On the other hand, since a rotor is inserted into this stator, it is necessary to prevent the coil end portions projecting from the axial end surface of the stator core without being housed in the slots from protruding more inwardly than the inner peripheral surface of the stator core.

Further, if the rotating electric machine is of a three-phase type, stator coils of three phases are mounted on a single stator core. Thus, in the rotating electric machine of the three-phase type, coil end portions of three phases projecting from the slots for each phase coil overlap each other.

In consideration of this, in a conventional manufacturing method, molding is performed to allow coil end portions of stator coils mounted first and projecting from slots to escape to a radially outer side of the stator core and, thereafter, other stator coils are inserted into slots. After the stator coils of three phases are mounted on the single stator core, molding is performed to let all the coil end portions of the phase stator coils to escape to the radially outer side again, thereby preventing the coil end portions of the stator coils of all the three phases from entering more inwardly than the inner peripheral surface of the stator core.

SUMMARY OF INVENTION

However, the stator coils fabricated in advance in the conventional inserter method are fabricated to be present within a plane. Thus, if these stator coils fabricated in advance are pushed into the slots of the stator core using the unillustrated inserter device, a plurality of coil side portions located within the plane are erected to be parallel to each other at that time. Specifically, since the inserter device erects the plurality of stator coil side portions located within the plane while converting a direction thereof substantially by a right angle, the conversion angle is relatively large, thereby presenting a problem that wire materials constituting the stator coils are possibly damaged when the side portions are erected.

Further, in the conventional inserter method, the size of the stator coils is set such that the coil end portions are located on the upper surface of the unillustrated push-up shaft when the mounting of the stator coils is completed as described above. Thus, the coil end portions relatively largely project from the end part of the stator core. The coil end portions relatively largely projecting from the end part of the core in this way has also caused problems in that the stator coils are enlarged and the entire length of the wire materials for manufacturing the stator coils is increased.

If the stator coils are enlarged in this way, there are also problems that so-called copper loss of the stator coils is increased, the efficiency of the rotating electric machine using the stator coils is deteriorated and the outer shape of the rotating electric machine is also enlarged.

Further, if a stator to be manufactured is of a three-phase type, the mounting of the stator coils needs to be performed three times and it is also necessary to mold the coil end portions between the mounting operations in the conventional inserter method. Thus, there have been problems that the automation of a manufacturing device (inserter device) becomes difficult and the mounting of the stator coils on the stator core takes a relatively long time because the same operation is repeated a plurality of times.

In the conventional inserter method, the stator coils have been mounted at one time in some cases. However, damage that might be given to the stator coil during the mounting is large, thereby causing a problem that automation is more difficult.

The present invention was developed in view of the above problems and an object thereof is to provide a stator manufacturing apparatus and a stator manufacturing method capable of automating a mounting operation while reducing damage caused on stator coils when the stator coils are mounted on a stator core, thereby being able to shorten a time taken for the mounting.

Another object of the present invention is to provide a stator manufacturing apparatus and a stator manufacturing method capable of improving a space factor of stator coils near end surfaces of a stator core by reducing a projecting amount of the stator coils mounted on the stator core from the stator core.

According to one aspect of the present invention, a stator manufacturing apparatus includes an insertion tool configured to be inserted into a stator core, the insertion tool having a plurality of slit-like holding grooves formed on an outer periphery in correspondence with a plurality of slots of the stator core, the insertion tool being configured such that a pair of side portions of a stator coil are disposed in two of the holding grooves separated by a predetermined width, and a pressing tool having a plurality of plate-like pushers narrowed toward tips arranged on a pressing body in correspondence with the positions of the plurality of holding grooves of the insertion tool. The pressing tool is configured to push the pairs of side portions of the stator coils inserted in the holding grooves radially outwardly and insert the side portions into the corresponding slots by inserting the pushers into the corresponding holding grooves at the tips. A recessed groove enabling grippers to be inserted when the stator coil is disposed using the grippers for gripping the pair of side portions is formed on the outer periphery of the insertion tool.

DESCRIPTION OF EMBODIMENTS

Hereinafter, an embodiment of the present invention is described with reference to the accompanying drawings.

Figure 1:
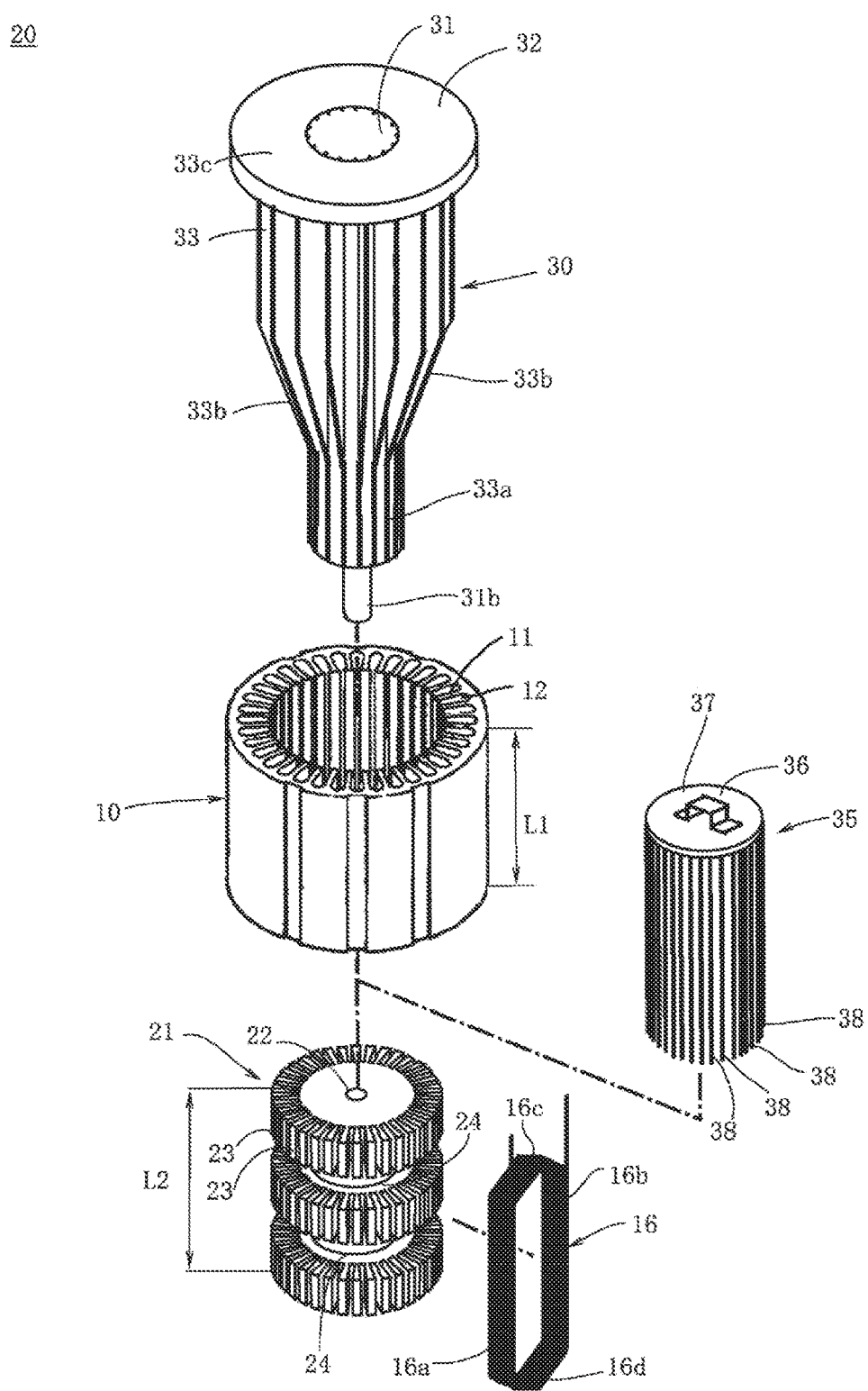
FIG. 1 is a perspective view showing a stator manufacturing apparatus in one embodiment of the present invention.
Figure 2:
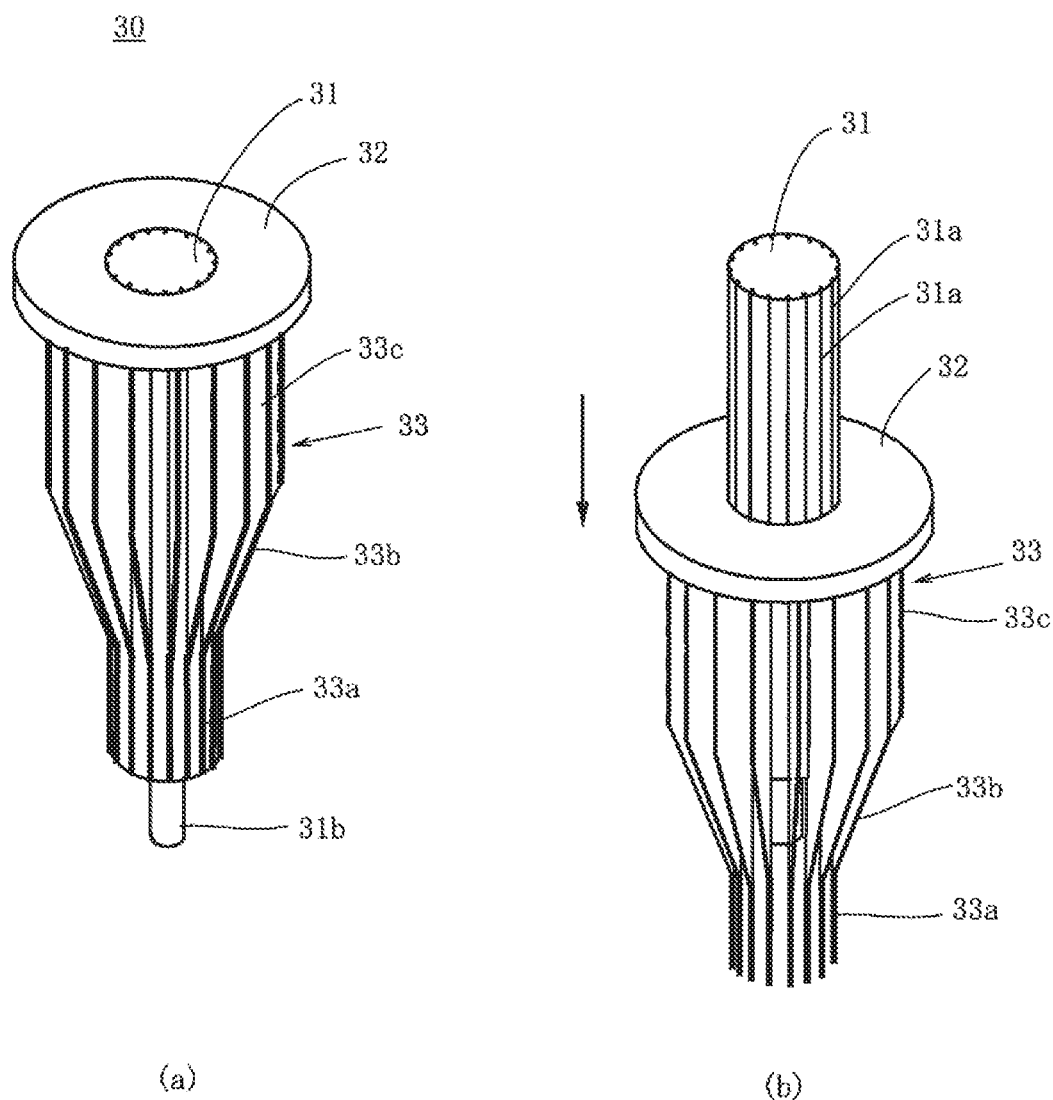
FIG. 2 are perspective views showing the operation of a pressing tool of the manufacturing apparatus of FIG. 1.
Figure 3:
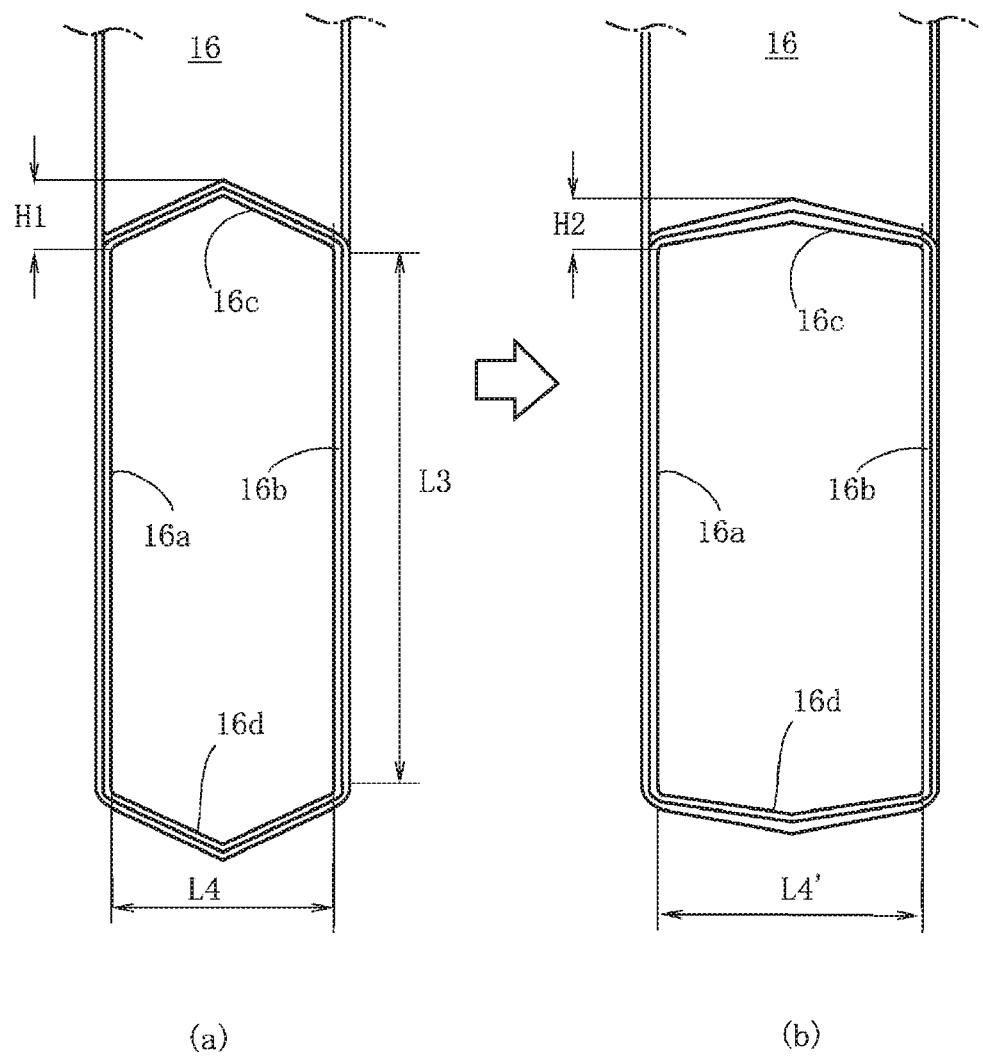
FIG. 3 are diagrams showing shapes of a stator coil to be inserted into slots of a stator core.
Figure 4:
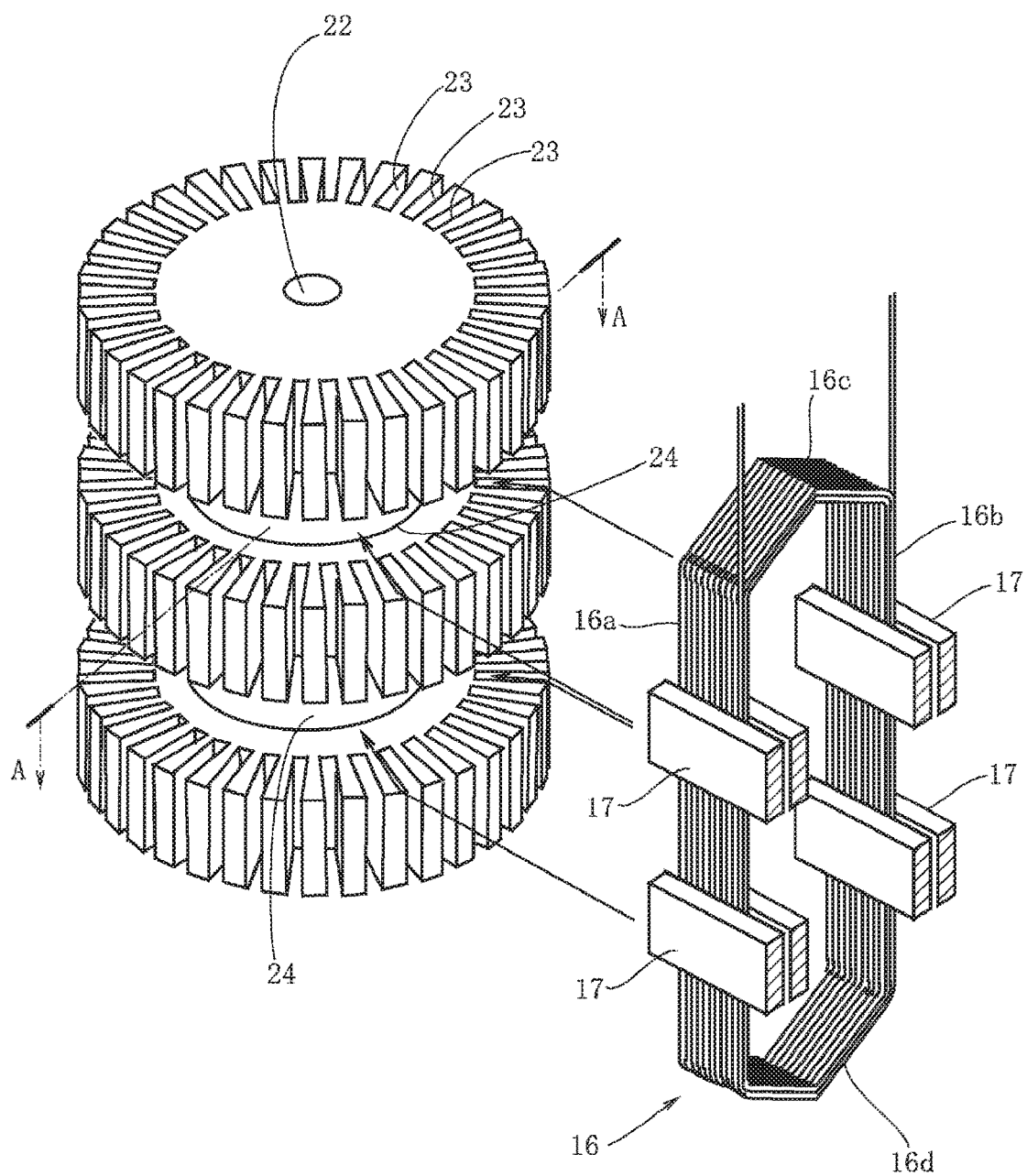
FIG. 4 is a perspective view showing an operation of inserting the stator coil into holding grooves of an insertion tool of the manufacturing apparatus of FIG. 1.

FIG. 1 is a perspective view showing a stator manufacturing apparatus 20 (hereinafter, merely referred to as the "manufacturing apparatus 20") in one embodiment of the present invention. FIG. 2 are perspective views showing the operation of a pressing tool 30 of the manufacturing apparatus 20 of FIG. 1. FIG. 3 are diagrams showing shapes of a stator coil 16 to be inserted into slots 12 of a stator core 10. FIG. 4 is a perspective view showing an operation of inserting the stator coil 16 into holding grooves 23 of an insertion tool 21 of the manufacturing apparatus 20 of FIG. 1.

It should be noted that coils are referred to as the "stator coils 16" even before being mounted on the stator core 10 for the sake of convenience in the following description.

As shown in FIG. 1, the stator core 10 constituting a stator includes a plurality of teeth (magnetic poles) 11 radially arranged and projecting radially inwardly and a plurality of slots 12 open between adjacent ones of the teeth 11 on an inner peripheral part thereof.

The manufacturing apparatus 20 of the present embodiment includes the insertion tool 21 configured to be insertable into this stator core 10 and the pressing tool 30 configured to push out the insertion tool 21 inserted in the stator core 10.

This manufacturing apparatus 20 manufactures a stator 9 (see FIG. 10) composed of the stator core 10 and a plurality of stator coils 16 by inserting both side portions 16a, 16b of a plurality of stator coils 16 wound in advance as shown in FIG. 3 into corresponding slots 12. It should be noted that the shape of each stator coil 16 is described later.

The insertion tool 21 has an entire length L2 substantially equal to an entire length (length in an extending direction of the slots 12) L1 of the stator core 10. As shown in FIG. 1, the insertion tool 21 has a substantially cylindrical shape as a whole. This cylindrical insertion tool 21 is formed with a fitting recess 22 at a center position of the upper end surface. Further, a plurality of holding grooves 23 are formed radially with respect to a center line passing through a center of the upper end surface on the outer peripheral surface of the insertion tool 21.

The holding grooves 23 are formed at the same pitch as that of the slots 12 of the stator core 10 at positions corresponding to those of the slots 12 of the stator core 10. Specifically, the insertion tool 21 is formed with as many holding grooves 23 as the slots 12 of the stator core 10. The holding grooves 23 are radially provided to extend radially outwardly from the outer periphery of the insertion tool 21 and formed over the entire length in a longitudinal direction of the insertion tool 21.

As shown in FIGS. 1, 3 and 4, the stator coil 16 to be mounted on the stator core 10 is produced by winding a wire material. As shown, the stator coil 16 includes a pair of the side portions (hereinafter, also referred to as the "both side portions") 16a, 16b extending in the extending direction of the slots 12. Further, the stator coil 16 includes a pair of coil end portions 16c, 16d coupling the end edges of the both side portions 16a, 16b and projecting from the upper and lower end edges of the stator core 10 in an axial direction. In the present embodiment, one side portion 16a and the other side portion 16b constituting the both side portions are configured to be insertable into the holding grooves 23 of the insertion tool 21.

Specifically, the both side portions 16a, 16b are so formed that a length L3 thereof in the axial direction (longitudinal direction) (see FIG. 3) is slightly longer than the entire length L1 of the stator core 10 (FIG. 1). Further, the both side portions 16a, 16b are formed such that a length L4 of the coil end portions 16c, 16d (see FIG. 3) is slightly longer than a length between two slots 12 into which the both side portions 16a, 16b are to be inserted. The coil end portions 16c, 16d coupling the end edges of the pair of both side portions 16a, 16b are wound to form a chevron shape as shown in FIG. 3.

The holding grooves 23 are formed to have such a depth capable of housing at least the both side portions 16a, 16b of the stator coil 16. As described later (see FIG. 5), the plurality of stator coils 16 produced in advance are successively arranged along a circumference of the insertion tool 21.

As shown in FIG. 4, on the outer periphery of the insertion tool 21, two recessed grooves 24 are formed along the outer periphery. When the stator coil 16 is inserted into the holding grooves 23 of the insertion tool 21, the both side portions 16a, 16b of the stator coil 16 are gripped by grippers 17. These grippers 17 grip the stator coil 16 at positions corresponding to the recessed grooves 24 of the insertion tool 21. In FIG. 4, the two recessed grooves 24 are formed over the entire outer periphery while being spaced apart by a predetermined distance. However, the number of the recessed grooves 24 is not limited to two and one, three or more recessed grooves may be formed according to the entire length L3 of the stator coil 16 in the axial direction.

The recessed grooves 24 are formed to be deeper than the holding grooves 23. This enables the grippers 17 gripping the both side portions 16a, 16b of the stator coil 16 to be inserted deeper than the depth of the holding grooves 23 when the stator coil 16 is housed into the holding grooves 23 of the insertion tool 21.

The pressing tool 30 is push-out means for pushing the both side portions 16a, 16b of the stator coils 16 inserted and held in the holding grooves 23 of the insertion tool 21 into the corresponding slots 12 of the stator core 10.

Figure 7:
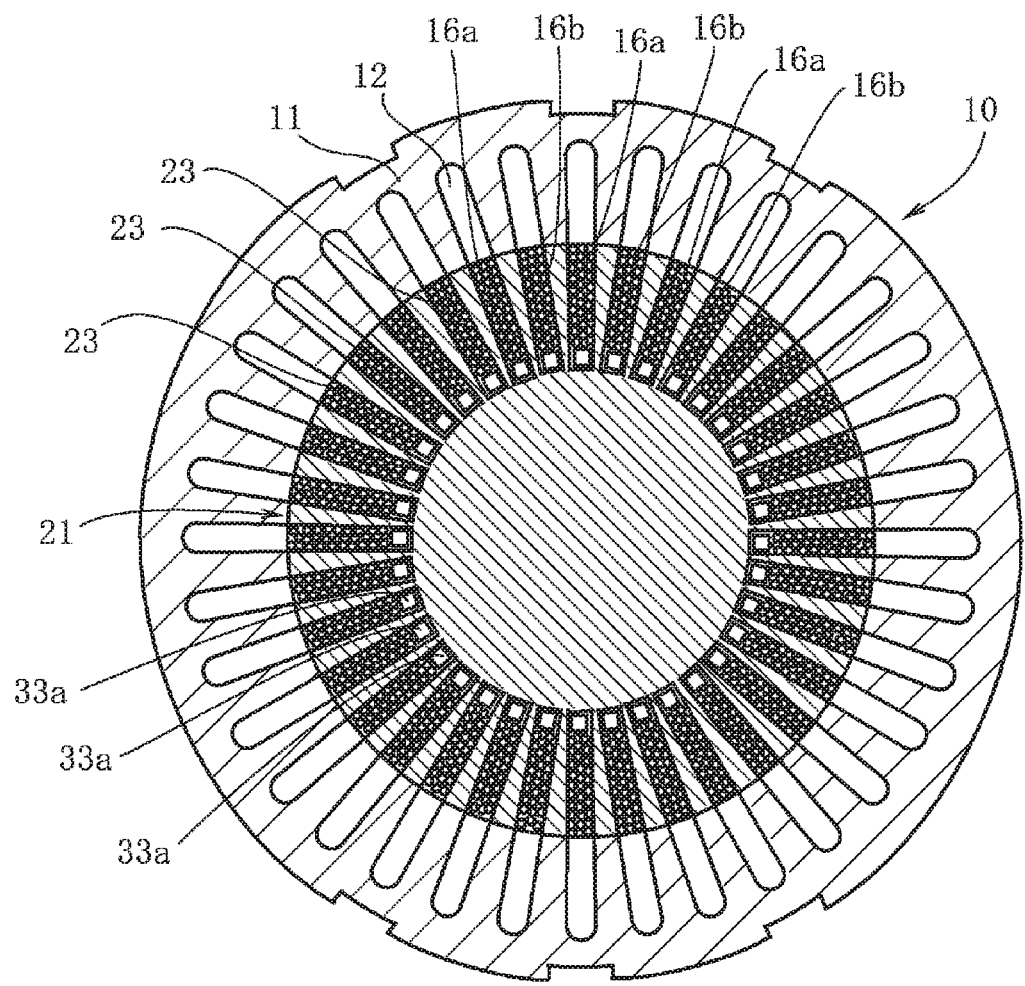
FIG. 7 is a sectional view along line B-B of FIG. 6.
Figure 8:
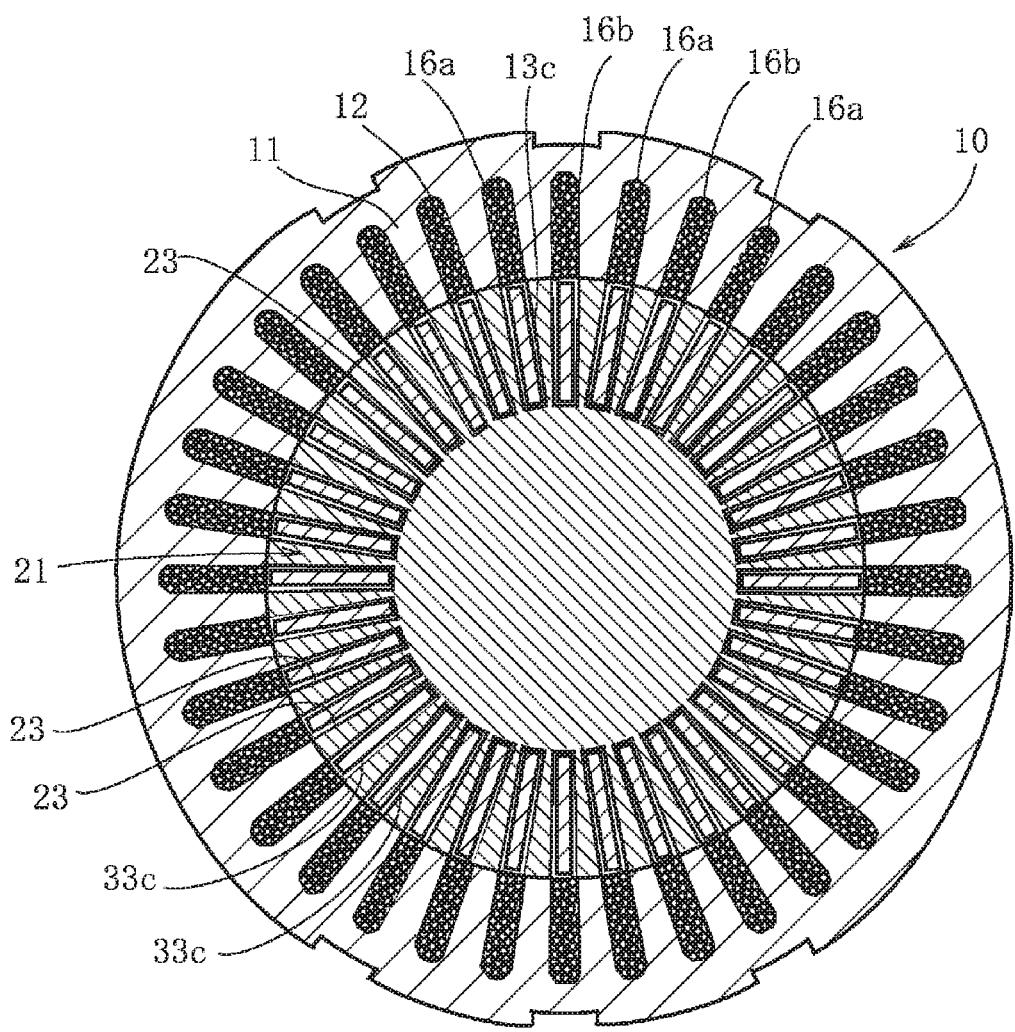
FIG. 8 is a sectional view, corresponding to FIG. 7, showing a state where the stator coils inserted into the holding grooves of the insertion tool are pushed radially outwardly and inserted into the corresponding slots of the stator core.

This pressing tool 30 is used to move the stator coils 16 from the holding grooves 23 of the insertion tool 21 toward the slots 12 of the stator core 10 as shown in FIG. 8 from a state where the insertion tool 21 is arranged inside the stator core 10 and the stator coils 16 are set between the stator core 10 and the insertion tool 21 (see FIG. 7). A specific stator manufacturing method is described later.

As shown in FIG. 2, the pressing tool 30 includes a guide shaft 31 extending in the axial direction and a pressing body 32 configured to slidably move along the outer peripheral surface of the guide shaft 31. Guide grooves 31a extending along the axial direction are formed at equal intervals in a circumferential direction on the outer periphery of the guide shaft 31. A projection 31b fittable into the fitting recess 22 formed on the upper surface of the insertion tool 21 is formed on the lower end of the guide shaft 31.

The annular pressing body 32 is mounted slidably along the guide grooves 31a of the guide shaft 31. The pressing body 32 has a predetermined thickness in the axial direction and a plurality of inner teeth fittable into the guide grooves 31a are provided on the inner periphery of the pressing body 32.

A plurality of plate-like pushers 33 are mounted at predetermined intervals in the circumferential direction on the lower surface of the pressing body 32. Each pusher 33 is configured to be fitted into the corresponding guide groove 31a of the guide shaft 31 and radially mounted on the guide shaft 31.

As shown in FIG. 2, each pusher 33 has the same structure. A narrow tip portion 33a is formed on a lower part of each pusher 33. A tapered portion 33b gradually widened from the narrow tip portion 33a toward the pressing body 32 is formed on a central part of each pusher 33. An outer peripheral part of this tapered portion 33b has a straight shape or an arcuate shape having a relatively large curvature. A wide portion 33c having a constant width (radial direction) from the tapered portion 33b toward the pressing body 32 is formed on an upper part of each pusher 33. The wide portion 33c is formed to have the width substantially equal to or slightly larger than the depth of the holding grooves 23 of the insertion tool 21. Further, the wide portion 33c is formed to have a length longer than the entire length L2 (FIG. 1) of the insertion tool 21 in the axial direction.

The guide grooves 31a and the pushers 33 of the guide shaft 31 are the same in number and at the same pitch as the holding grooves 23 of the insertion tool 21. Specifically, the plurality of plate-like pushers 33 mounted on the lower surface of the pressing body 32 are respectively fitted into the corresponding guide grooves 31a of the guide shaft 31 and mounted radially with respect to the guide shaft 31.

Further, the numbers and the pitches of the guide grooves 31a and the pushers 33 of the guide shaft 31 are set such that the pushers 33 are insertable into a plurality of slots 12 of the stator core 10. It should be noted that the numbers of the guide grooves 31a and the pushers 33 are smaller than that of the holding grooves 23 in FIGS. 1, 2(a) and 2(b) for the convenience of illustration.

After the insertion tool 21 is arranged in the stator core 10, the projection 31b of the pressing tool 30 is fitted into the fitting recess 22 of the insertion tool 21 in a state as shown in FIG. 2(a). Then, by pressing the pressing body 32 of the pressing tool 30 downwardly of FIG. 2 as shown in FIG. 2(b), the narrow tip portions 33a, the tapered portions 33b and the wide portions 33c of the pushers 33 are used to successively project from the guide shaft 31.

As shown in FIG. 1, the manufacturing apparatus 20 further includes an auxiliary tool 35. This auxiliary tool 35 is for forming a clearance, into which the corresponding narrow tip portion 33a of the pusher 33 of the pressing tool 30 is insertable, on an end part of each holding groove 23 of the insertion tool 21.

This auxiliary tool 35 includes a disk-shaped base plate 37 having a grip 36 attached thereto, and has as many pins 38 as the holding grooves 23 of the insertion tool 21 provided near the outer periphery of the base plate 37.

Figure 5:
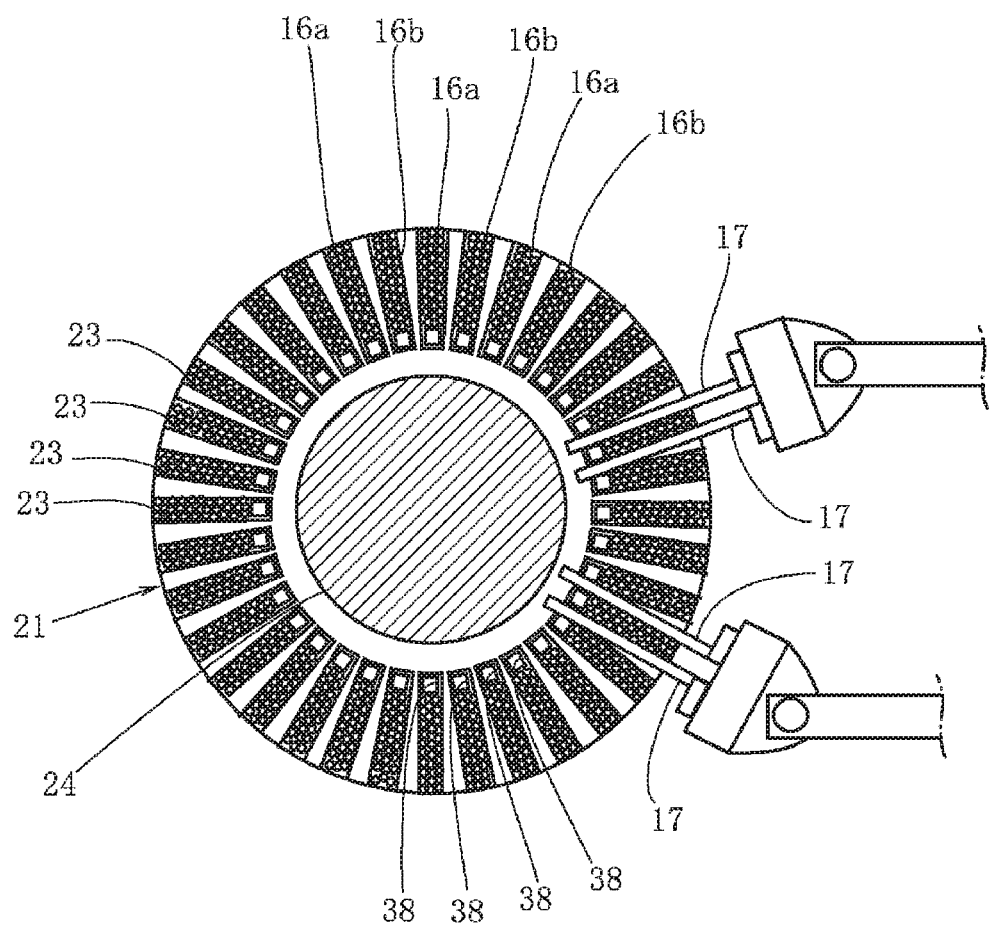
FIG. 5 is a sectional view along line A-A of FIG. 4 in a state where both side portions of each stator coil are inserted in the holding grooves of the insertion tool and an auxiliary tool is overlapped with the insertion tool.

A plurality of pins 38 are configured to have a length longer than the length of the holding grooves 23 of the insertion tool 21 in the axial direction. In a state where the plurality of pins 38 of the auxiliary tool 35 are inserted in the holding grooves 23 of the insertion tool 21 and the base plate 37 of the auxiliary tool 35 is placed on an end surface of the insertion tool 21, the plurality of pins 38 are respectively inserted near the bottom surfaces of the holding grooves 23 and interposed between the bottom surfaces of the holding grooves 23 and the stator coils 16 inserted in the holding grooves 23 as shown in FIG. 5. As just described, the auxiliary tool 35 is configured to form the clearances, into which the narrow tip portions 33a of the pushers 33 are insertable, near the bottom surfaces of the holding grooves 23 of the insertion tool 21. It should be noted that FIG. 5 is a sectional view along line A-A of FIG. 4 in a state where the both side portions 16a, 16b of each stator coil 16 are inserted in the holding grooves 23 of the insertion tool 21 and the auxiliary tool 35 is overlapped with the insertion tool 21.

Next, the operation of the stator manufacturing apparatus 20 in the present embodiment for manufacturing a stator using the aforementioned manufacturing apparatus 20, i.e. the stator manufacturing method in the present embodiment is described.

The stator manufacturing method (hereinafter, merely referred to as the "manufacturing method") of the present embodiment is a method for manufacturing the stator 9 (see FIG. 10) by inserting the pairs of both side portions 16a, 16b of the plurality of stator coils 16 (see FIG. 3) wound in advance into the slots 12 of the stator core 10 as described above. In this manufacturing method, the insertion tool 21 formed with the holding grooves 23 at the predetermined intervals on the outer periphery as described is used.

In the manufacturing method of the present embodiment, the plurality of stator coils 16 are first produced by winding wire materials using an unillustrated commercially available winding machine as shown in FIG. 3. Subsequently, the pairs of both side portions 16a, 16b of the plurality of stator coils 16 produced in advance are inserted one by one into the corresponding holding grooves 23 of the insertion tool 21. In this way, all the stator coils 16 are arranged in the holding grooves 23 of the insertion tool 21 along the circumference of the insertion tool 21.

As described above, each stator coil 16 includes the pair of both side portions 16a, 16b to be inserted into the slots 12 of the stator core 10 and the pair of coil end portions 16*c*, 16*d* coupling the end edges of the side portions 16*a*, 16*b* (see FIG. 1). The both side portions 16*a*, 16*b* are formed to have the length L3 (see FIG. 3) slightly longer than the entire length L1 (see FIG. 1) of the stator core 10.

Further, the coil end portions 16*c*, 16*d* are formed to have the length L4 (see FIG. 3) slightly longer than the length between two slots 12 into which the both side portions 16*a*, 16*b* are to be inserted. It should be noted that the coil end portions 16*c*, 16*d* are wound to form a chevron shape projecting axially outwardly as shown in FIG. 3.

Subsequently, after the stator coils 16 produced in this way are arranged in the holding grooves 23 of the insertion tool 21, the auxiliary tool 35 shown in FIG. 1 is inserted into the insertion tool 21 from an upper side of FIG. 1. Here, the auxiliary tool 35 is inserted into the insertion tool 21 to place the base plate 37 of the auxiliary tool 35 on the end surface of the insertion tool 21 as described above, whereby the plurality of pins 38 of the auxiliary tool 35 are inserted near the bottom surfaces of the corresponding holding grooves 23 as shown in FIG. 5. It should be noted that it is also possible to omit this process of inserting the auxiliary tool 35.

By overlapping the auxiliary tool 35 with the insertion tool 21 after the both side portions 16*a*, 16*b* of the plurality of stator coils 16 are inserted into the holding grooves 23 of the insertion tool 21 in this way, the pins 38 of the auxiliary tool 35 are interposed between the bottom surfaces of the holding grooves 23 and the stator coils 16 inserted in the holding grooves 23. In this way, the clearances into which the narrow tip portions 33*a* of the pushers 33 are insertable are formed near the bottom surfaces of the holding grooves 23.

Here, to insert the pair of both side portions 16*a*, 16*b* of each of the plurality of stator coils 16 into the corresponding holding grooves 23 of the insertion tool 21, the both side portions 16*a*, 16*b* of the stator coil 16 are gripped by the grippers 17, the grippers 17 are moved by an unillustrated actuator and the both side portions 16*a*, 16*b* of the stator coil 16 are inserted into the corresponding holding grooves 23.

Since the recessed grooves 24 capable of gripping the inserted grippers 17 are formed on the outer periphery of the insertion tool 21, the grippers 17 can be inserted deeper than the depth of the holding grooves 23 when the stator coil 16 is mounted on the insertion tool 21. In this way, the both side portions 16*a*, 16*b* of the stator coil 16 gripped by the grippers 17 can be reliably inserted into the corresponding holding grooves 23. Thus, by manufacturing the stator using an unillustrated automatic manufacturing apparatus with the grippers 17 and the actuator for moving the grippers 17, the stator coils 16 can be arranged on the insertion tool 21 by an automated operation without requiring any operator.

It should be noted that a case where the both side portions 16*a*, 16*b* of the stator coil 16 are directly gripped by the grippers 17 is shown in FIG. 4. However, if necessary, at least parts of the both side portions 16*a*, 16*b* to be gripped by the grippers 17 may be covered with insulating paper or tape in advance and the insulated both side portions 16*a*, 16*b* may be gripped by the grippers 17.

Such a covering operation with the insulating paper, the tape or the like can be performed for each stator coil 16 using a commercially available machine or the like. Thus, even if the insulated both side portions 16*a*, 16*b* are gripped by the grippers 17, the operation of arranging the stator coil 16 into the holding grooves 23 of the insertion tool 21 can be entirely automated.

Figure 6:
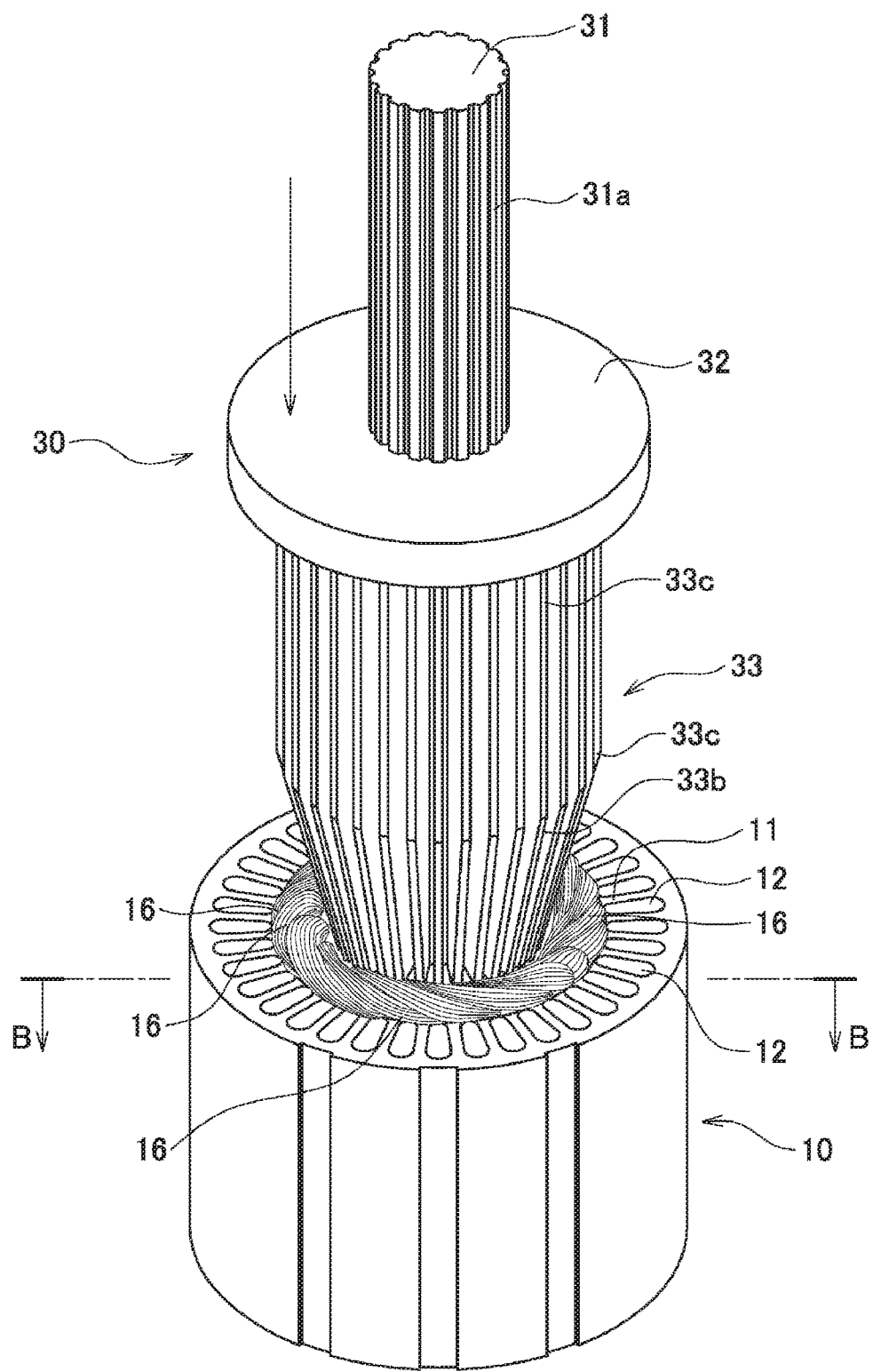
FIG. 6 is a perspective view showing a state where the insertion tool having the stator coils arranged thereon is arranged in the stator core and pushers of the pressing tool are inserted into the corresponding holding grooves at tips.

Subsequently, as shown in FIG. 7, the insertion tool 21 having the plurality of stator coils 16 arranged along the outer periphery is inserted into the stator core 10. FIG. 6 is a perspective view showing a state where the insertion tool 21 having the stator coils 16 arranged in the holding grooves 23 is arranged in the stator core 10 and the pushers 33 of the pressing tool 30 are inserted into the corresponding holding grooves 23 at the tips. FIG. 7 is a sectional view along line B-B of FIG. 6. It should be noted that FIGS. 6 and 7 show a state where the insertion tool 21 is completely inserted in the stator core 10.

In the case of using the auxiliary tool 35, the auxiliary tool 35 is detached (separated) from the insertion tool 21 before the insertion tool 21 is inserted into the stator core 10. It is preferable to pull out the plurality of pins 38 of the auxiliary tool 35 from the corresponding holding grooves 23 of the insertion tool 21 in advance in this way for the next process.

It should be noted that this separation of the auxiliary tool 35 from the insertion tool 21 may be performed after the insertion tool 21 is inserted into the stator core 10. In this way, the clearances are formed near the bottom sides of the holding grooves 23 of the insertion tool 21 by the plurality of pins 38 of the auxiliary tool 35.

Subsequently, the projection 31*b* of the pressing tool 30 is fitted into the fitting recess 22 of the insertion tool 21. At this time, the pressing tool 30 is positioned such that the narrow tip portions 33*a* of the pusher 33 face the clearances formed by separating the pins 38 of the auxiliary tool 35.

Subsequently, as shown in FIG. 6, the pressing body 32 is slid in a direction of an arrow shown in FIG. 6 with the pressing tool 30 positioned. In this way, the both side portions 16*a*, 16*b* of the stator coils 16 held in the holding grooves 23 of the insertion tool 21 are pushed radially outwardly and inserted into the corresponding slots 12 of the stator core 10.

Specifically, the pressing tool 30 shown in FIG. 2 is placed atop the insertion tool 21 and the rotational position thereof is determined to align the pushers 33 with the holding grooves 23. Then, the pressing body 32 is slid downward with respect to the guide shaft 31 and the narrow tip portions 33*a* of the pushers 33 are inserted into the holding grooves 23 from lower end sides thereof.

In this way, the narrow tip portions 33*a* of the pushers 33 are first inserted into the holding grooves 23 and, thereafter, the tapered portions 33*b* are inserted thereinto. As described above, the clearances are formed in advance between bottom parts of the holding grooves 23 of the insertion tool 21 and the stator coils 16 located in the holding grooves 23 by inserting the pins 38 of the auxiliary tool 35 (see FIG. 5). Thus, as shown in FIG. 7, the narrow tip portions 33*a* of the pushers 33 can be quickly inserted into those clearances. Therefore, the tips of the narrow tip portions 33*a* of the pushers 33 can be effectively prevented from damaging the stator coils 16 by coming into contact with the stator coils 16.

Subsequently, the pressing body 32 is further slid in the arrow direction from the state shown in FIG. 6. In this way, the tapered portions 33*b* are inserted into the holding grooves 23 of the insertion tool 21, following the narrow tip portions 33*a*. The tapered portions 33*b* are inserted into the stator core 10 while pushing the both side portions 16*a*, 16*b* of the stator coils 16 located in the holding grooves 23 radially outwardly of the insertion tool 21. Specifically, the both side portions 16*a*, 16*b* located in the holding grooves 23 are gradually pushed out by being pushed radially outwardly by the tapered portions 33*b* of the pushers 33.

Subsequently, the pressing body 32 is further slid in the arrow direction shown in FIG. 6 to completely insert the wide portions 33*c* of the pushers 33 into the stator core 10.

By completely inserting the wide portions 33c of the pushers 33 into the stator core 10 in this way, the stator coils 16 are completely inserted into the slots 12 of the stator core 10 as shown in FIG. 8. FIG. 8 is a sectional view, corresponding to FIG. 7, showing a state where the stator coils 16 inserted in the holding grooves 23 of the insertion tool 21 are pushed radially outwardly to be inserted into the corresponding slots 12 of the stator core 10.

Figure 9:
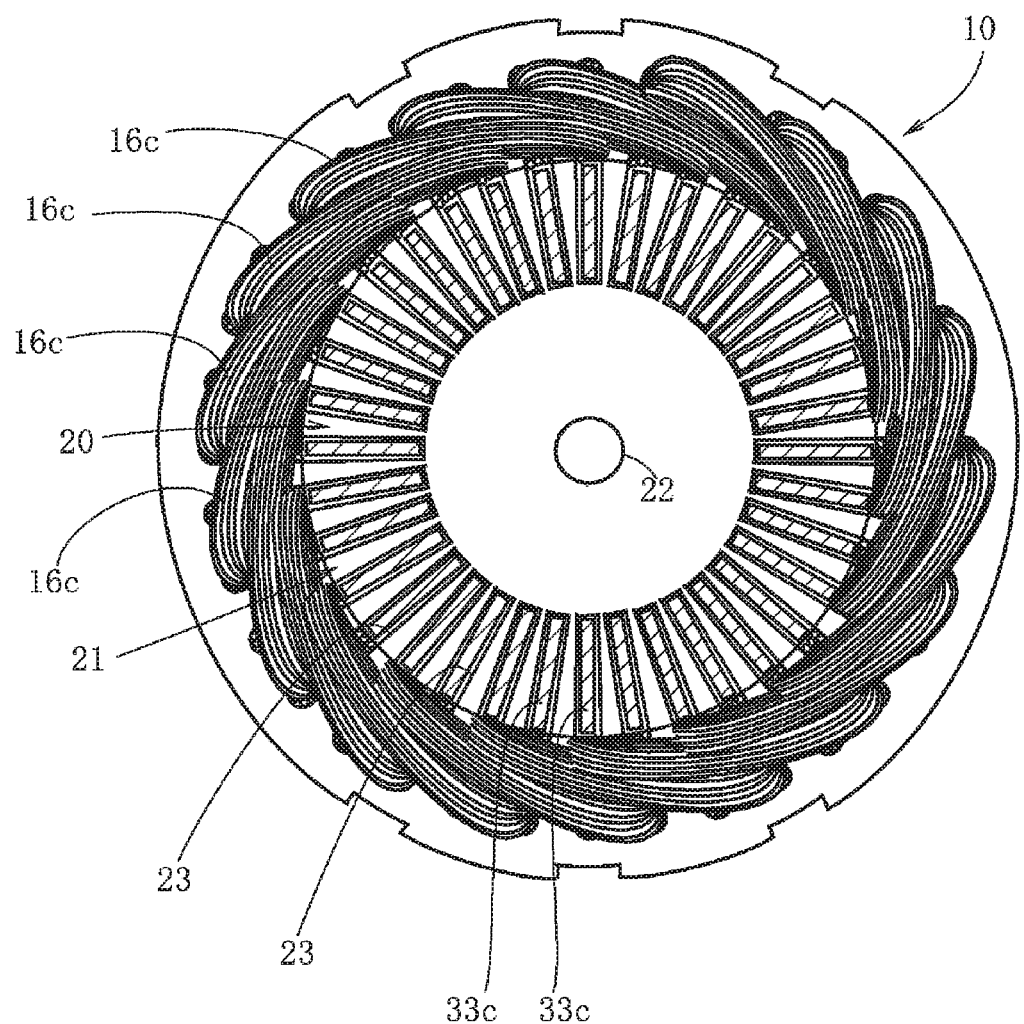
FIG. 9 is a top view of the manufacturing apparatus when the stator coils are completely inserted into the slots of the stator core.

In the present embodiment, a case is shown where one side portion 16a of the stator coil 16 is inserted into the corresponding slot 12 and the other side portion 16b of the stator coil 16 is inserted into the fifth slot 12 from the former slot 12. In the manufacturing method for the stator 9 of the present embodiment, the inserting operation of the stator coil 16 is simultaneously performed for the plurality of stator coils 16. Thus, with the pressing tool 30 completely inserted in the stator core 10, the coil end portions 16c, 16d of the stator coils 16 are spiral as shown in FIG. 9. FIG. 9 is a top view of the manufacturing apparatus 20 when the stator coils 16 are completely inserted into the slots 12 of the stator core 10. It should be noted that the pressing body 32 and the guide shaft 31 of the pressing tool 30 are not shown for making a state of the coil end portions 16c of the stator coils 16 visible in FIG. 9. On the other hand, the wide portions 33c of the pushers 33 are shown in cross-section in FIG. 9.

Figure 10:
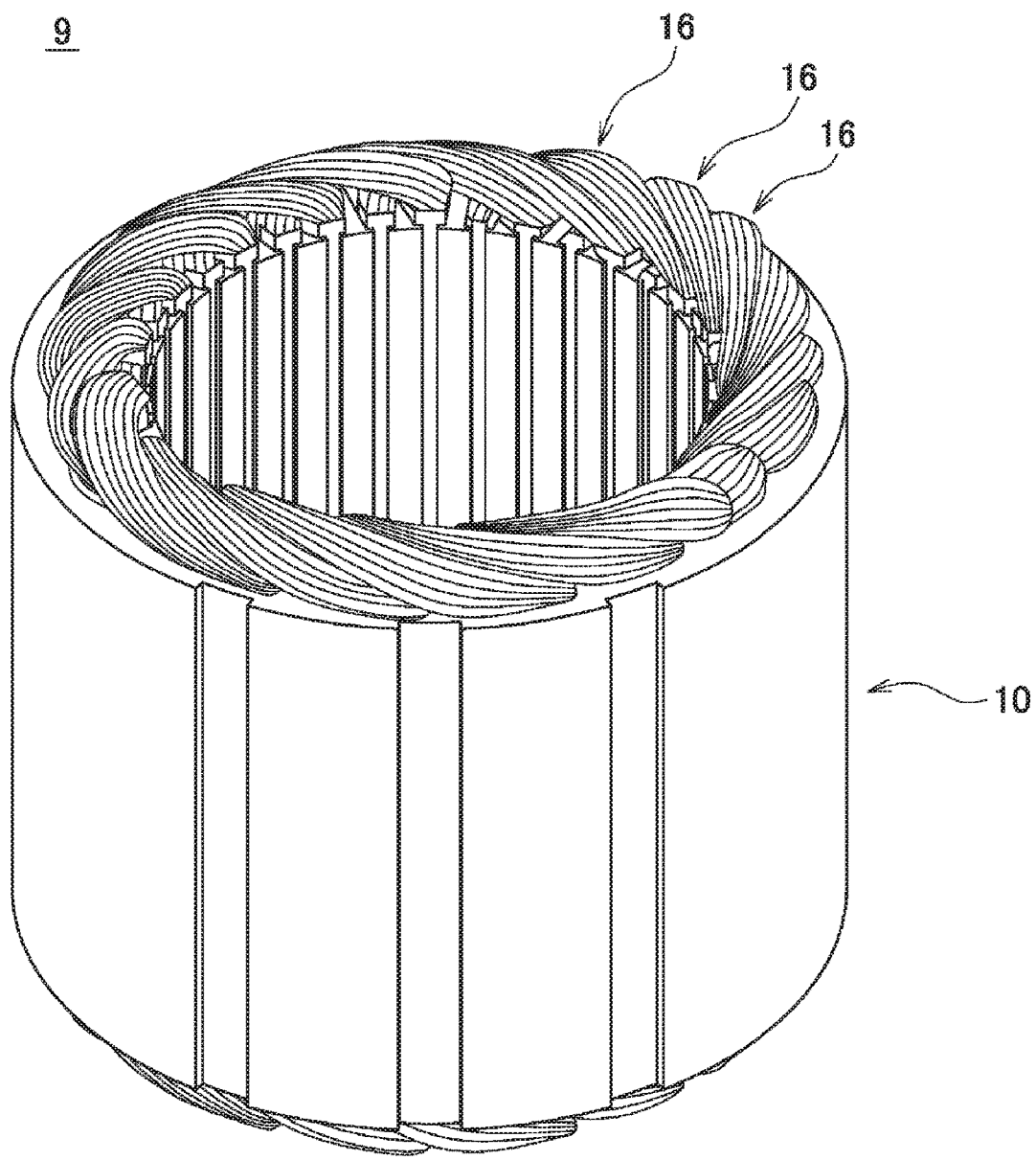
FIG. 10 is a perspective view of a stator manufactured by the manufacturing apparatus of the embodiment.

Subsequently, the pressing tool 30 is separated upwardly from the state shown in FIG. 9 and, thereafter, the insertion tool 21 is separated downwardly or upwardly. In this way, the stator 9 as shown in FIG. 10 is completed. It should be noted that the pressing tool 30 and the insertion tool 21 may be simultaneously separated upwardly as long as the stator 9 is not damaged.

In the present embodiment, the stator coils 16 are inserted into the slots 12 by pushing and widening the both side portions 16a, 16b of the stator coils 16 held by the insertion tool 21 radially outwardly using the pressing tool 30. Here, since the holding groove 23 of the insertion tool 21 is more separated from adjacent holding grooves 23 toward a radially outer side, a spacing L4 between the both side portions 16a, 16b of the stator coil 16 held by the insertion tool 21 is widened in a circumferential direction when the stator coil 16 is inserted into the slots 12 of the stator core 10. Specifically, the stator coil 16 is shaped as shown in FIG. 3(a) when being held by the insertion tool 21. Thereafter, when being inserted into the slots 12 of the stator core 10, the stator coil 16 is widened to have a larger spacing L4' as shown in FIG. 3(b).

As just described, the spacing between the both side portions 16a, 16b is extended from L4, in the state where the both side portions 16a, 16b of the stator coil 16 are inserted in the holding grooves 23 of the insertion tool 21 as shown in FIG. 3(a), to L4' as shown in FIG. 3(b). Thus, a height H2 of the coil end portions 16c, 16d projecting from the end surfaces of the stator core 10 becomes smaller than a height H1 of the coil end portions 16c, 16d when the stator coil 16 is held on the insertion tool 21 by the insertion of the stator coil 16 into the slots 12 of the stator core 10. Thus, in the manufacturing apparatus and the manufacturing method for the stator 9 of the present embodiment, the stator 9 (see FIG. 10) can be manufactured in which the height of the coil end portions 16c, 16d, which are parts projecting from the opposite axial end surfaces of the stator core 10, of the stator coils 16 is relatively reduced and uniform over the entire circumference.

Since the stator coils 16 are spirally arranged side by side in the circumferential direction while partially overlapping in the thus manufactured stator 9, cogging torque ripple when a motor or the like is formed by inserting a rotor into the inner periphery is very small. This can drastically reduce vibration and noise during the operation of the stator 9. Further, since the coil end portions 16c, 16d are compact and uniformly projecting, this stator 9 and a motor produced using that can be made compact.

As described above, the manufacturing apparatus 20 for the stator 9 of the present embodiment includes the insertion tool 21 configured to be insertable into the stator core 10, having the plurality of slit-like holding grooves 23 formed on the outer periphery in correspondence with the plurality of slots 12 of the stator core 10 and configured such that the pair of side portions of the stator coil 16 are disposed in two holding grooves 23 separated by a predetermined width, and the pressing tool 30 having the plurality of plate-like pushers 33 narrowed toward the tips arranged on the pressing body 32 in correspondence with the positions of the plurality of holding grooves 23 of the insertion tool 21. The pressing tool 30 is configured to push the pairs of side portions 16a, 16b of the stator coils 16 inserted in the holding grooves 23 radially outwardly and insert the side portions 16a, 16b into the corresponding slots 12 by inserting the pushers 33 into the corresponding holding grooves 23 at the tips, and the recessed grooves 24 enabling the grippers 17 to be inserted are formed on the outer periphery of the insertion tool 21 when the stator coil 16 is disposed using the grippers 17 for gripping the pair of side portions 16a, 16b. By configuring the manufacturing apparatus 20 for the stator 9 in this way, the grippers 17 can be inserted into the recessed grooves 24 deeper than the depth of the holding grooves 23 when the stator coil 16 is mounted on the insertion tool 21. In this way, the both side portions 16a, 16b of the stator coil 16 gripped by the grippers 17 can be reliably inserted into the corresponding holding grooves 23. Thus, by manufacturing the stator 9 using the unillustrated automatic manufacturing apparatus with the grippers 17 and the actuator for moving the grippers 17, the stator coils 16 can be arranged on the insertion tool 21 by an automated operation without requiring any operator.

Further, unlike the method for inserting the coils from one end toward the other end of the stator core using the conventional inserter device, the both side portions 16a, 16b of the stator coils 16 in the holding grooves 23 are pushed and widened radially outwardly to be inserted into the slots 12 of the stator core 10 in the manufacturing apparatus 20 of the present embodiment. As just described, in the manufacturing apparatus 20 of the present embodiment, the stator coils 16 are inserted between the teeth 11 of the stator core 10 from a radially inner side while maintaining its state. Thus, damage given to the stator coils 16 can be reduced unlike the conventional inserter method for pulling the both side portions of the stator coils in the axial direction while erecting the both side portions.

Even if the stator 9 to be manufactured is of a three-phase type, an operation of inserting the both side portions 16a, 16b of the stator coils 16 inserted in the holding grooves 23 into the slots 12 of the stator 9 can be simultaneously performed at once for the plurality of stator coils. Thus, unlike the conventional inserter method in which the insertion of the stator coils is separately performed three times for the stator of the three-phase type, a time taken for the mounting of the stator coils can be shortened. Thus, in the manufacturing apparatus 20 of the present embodiment, the entire manufacturing apparatus 20 can be automated while damage given to the stator coils during the mounting is reduced. This can shorten a time taken for the mounting of the stator coils 16 on the stator core 10.

Further, if the both side portions 16a, 16b of the stator coils 16 are inserted into the slots 12 of the stator core 10 from the state where the both side portions 16a, 16b of the stator coils 16 are inserted in the holding grooves 23 of the insertion tool 21, the spacing between the both side portions is extended. In this way, the height of the coil end portions 16c, 16d projecting from the end surfaces of the stator core 10 can be reduced. Thus, in the manufacturing apparatus 20 of the present embodiment, a space factor of the coil end portions 16c, 16d near the end surfaces of the stator core 10 can be improved by reducing the projecting amount of the coil end portions 16c, 16d.

In the embodiment described above, the manufacturing apparatus 20 for the stator 9 further includes the auxiliary tool 35 provided with the plurality of pins 38 corresponding to the plurality of holding grooves 23 of the insertion tool 21, and the clearances into which the narrow tip portions 33a of the corresponding pushers 33 are insertable can be formed on the end parts of the holding grooves 23 by respectively inserting the plurality of pins 38 of the auxiliary tool 35 between the bottom surfaces of the holding grooves 23 and the side portions 16a, 16b inserted in the holding grooves 23 when the pairs of the side portions 16a, 16b of the stator coils 16 are inserted into the holding grooves 23 of the insertion tool 21. Since the clearances are formed in advance between the bottom parts of the holding grooves 23 of the insertion tool 21 and the stator coils 16 located in the holding grooves 23 by the insertion of the pins 38 of the auxiliary tool 35, the narrow tip portions 33a of the pushers 33 can be quickly inserted into those clearances as shown in FIG. 7. Therefore, the tips of the narrow tip portions 33a of the pushers 33 can be effectively prevented from damaging the stator coils 16 by coming into contact with the stator coils 16.

Further, the manufacturing method for the stator 9 of the present embodiment is a method for manufacturing the stator 9 by inserting the pairs of side portions 16a, 16b of the plurality of stator coils 16 wound in advance into the corresponding slots 12 of the stator core 10. The pairs of side portions 16a, 16b of the stator coils 16 are successively disposed into two holding grooves 23 of the insertion tool 21 having the plurality of slit-like holding grooves 23 formed on the outer periphery, the two holding grooves 23 being separated by the predetermined width, while being shifted one by one. The plurality of stator coils 16 are arranged along the circumference of the insertion tool 21, the insertion tool 21 is inserted into the stator core 10 and positioned such that the holding grooves 23 face the corresponding slots 12 of the stator core 10. The side portions 16a, 16b of each stator coil 16 are pushed radially outwardly by push-out means to be respectively inserted into the corresponding slots 12 of the stator core 10. By configuring the manufacturing method for the stator 9 of the present embodiment in this way, effects similar to those of the above manufacturing apparatus 20 can be exhibited.

In the aforementioned embodiment, the above push-out means is the pressing tool 30 having the plurality of plate-like pushers 33 narrowed toward the tips arranged on the pressing body 32 in correspondence with the positions of the plurality of holding grooves 23 of the insertion tool 21. The side portions 16a, 16b of the stator coils 16 arranged in the holding grooves 23 may be pushed radially outwardly and respectively inserted into the corresponding slots 12 of the stator core 10 by inserting the pushers 33 of the pressing tool 30 into the corresponding holding grooves 23 of the insertion tool 21 at the tips in a step of inserting the stator coils 16 into the slots 12 of the stator core 10. By configuring the manufacturing method for the stator 9 of the present embodiment in this way, effects similar to those of the above manufacturing apparatus 20 can be exhibited.

Further, in the aforementioned embodiment, the clearances enabling the narrow tip portions 33a of the corresponding pushers 33 to be inserted into the end parts of the holding grooves 23 may be formed by inserting the plurality of pins 38 of the auxiliary tool 35 between the bottom surfaces of the holding grooves 23 and the side portions 16a, 16b inserted in the holding grooves 23 after the stator coils 16 are arranged, using the auxiliary tool 35 provided with the plurality of pins 38 corresponding to the plurality of holding grooves 23 of the insertion tool 21. In this way, the narrow tip portions 33a of the pushers 33 can be quickly inserted into those clearances and the tips of the narrow tip portions 33a of the pushers 33 can be effectively prevented from damaging the stator coils 16 by coming into contact with the stator coils 16.

Further, in the aforementioned embodiment, the recessed grooves 24 enabling the grippers 17 to be inserted may be formed on the outer periphery of the insertion tool 21 when the stator coil 16 is disposed using the grippers 17 for gripping the pair of side portions 16a, 16b. In this way, the grippers 17 can be inserted into the recessed grooves 24 deeper than the depth of the holding grooves 23 when the stator coil 16 is mounted on the insertion tool 21. Thus, the both side portions 16a, 16b of the stator coil 16 gripped by the grippers 17 can be reliably inserted into the corresponding holding grooves 23.

Further, in the aforementioned embodiment, the stator coil 16 may be wound such that the coil end portions 16c, 16d coupled to the end edges of the pair of side portions 16a, 16b form a chevron shape projecting outwardly. By forming the stator coils 16 produced in advance in this way, the stator 9 can be manufactured such that the height of the coil end portions 16c, 16d, which are parts projecting from the opposite axial end surfaces of the stator core 10, of the stator coils 16 is relatively reduced and uniform over the entire circumference.

The embodiments of the present invention described above are merely illustration of some application examples of the present invention and not of the nature to limit the technical scope of the present invention to the specific constructions of the above embodiments.

It should be noted that a case where two recessed grooves 24, into which the grippers 17 are insertable, are formed along the outer periphery of the insertion tool 21 while being spaced part by the predetermined distance in the axial direction has been described in the aforementioned embodiment. However, the number of these recessed grooves 24 is not limited to two. In the case of inserting the stator coil 16 into the holding grooves 23 of the insertion tool 21 using the grippers 17, three or more recessed grooves 24 may be provided on the outer periphery of the insertion tool 21 if necessary.

The present application claims a priority based on Japanese Patent Application No. 2014-103960 filed with the Japan Patent Office on May 20, 2014, all the contents of which are hereby incorporated by reference.

The invention claimed is:

1. A stator manufacturing apparatus comprising:
   an insertion tool configured to be inserted into a stator core that has slots, the insertion tool having holding grooves formed on an outer periphery in correspondence with the slots, the insertion tool being configured to accommodate a pair of side portions of a stator coil in two of the holding grooves separated by a predetermined width;

a gripping tool configured to grip the pair of side portions of the stator coil and insert the pair of side portions of the stator coil into the two of the holding grooves;

a pressing tool having a pressing body and plate-like pushers arranged on the pressing body in correspondence with positions of the holding grooves of the insertion tool, the plate-like pushers having tips and widths that narrow toward the tips, wherein the pressing tool is configured to push radially outward the pair of side portions of the stator coil inserted in the two of the holding grooves and insert the side portions into corresponding slots of the stator core by inserting the tips of the pushers into the two of the holding grooves, and the insertion tool has a recessed groove formed circumferentially on the outer periphery configured to enable the gripping tool to be inserted therein when the gripping tool inserts the pair of side portions of the stator coil into the two of the holding grooves.

2. The stator manufacturing apparatus according to claim 1, further comprising:

an auxiliary tool provided with pins, wherein the pins are configured to be inserted into the holding grooves of the insertion tool between bottom surfaces of the holding grooves and the pair of side portions of the stator coil inserted in the two of the holding grooves, after the pair of side portions of the stator coil are inserted into the two of the holding grooves of the insertion tool, to form clearances to accept entering of the tips of the pushers, between the bottom surfaces of the holding grooves and the pair of the side portions inserted in the two of the holding grooves.

3. The stator manufacturing apparatus according to claim 1, wherein the recessed groove is formed to be deeper than the holding grooves.

4. A stator manufacturing method, comprising:

successively performing a process of gripping a pair of side portions of a stator coil and inserting the pair of side portions of the stator coil into two of holding grooves, separated by a predetermined width, of an insertion tool by using a gripping tool, the holding grooves being formed on an outer periphery of the insertion tool in correspondence with slots of a stator core, the insertion tool being configured to accommodate the pair of side portions of the stator coil in the two of the holding grooves;

thereafter inserting the insertion tool into the stator core and positioning the insertion tool such that the holding grooves face corresponding slots of the stator core; and pushing the pair of side portions of the stator coil radially outwardly to respectively insert the pair of side portions into the corresponding slots of the stator core using a pressing tool, wherein the pressing tool has a pressing body and plate-like pushers arranged on the pressing body in correspondence with positions of the holding grooves of the insertion tool, and the insertion tool has a recessed groove formed circumferentially on the outer periphery configured to enable the gripping tool to be inserted therein when the gripping tool inserts the pair of side portions of the stator coil into the two of the holding grooves.

5. The stator manufacturing method according to claim 4, further comprising:

forming clearances to accept entering of the tips of the pushers between bottom surfaces of the holding grooves and the pair of side portions inserted in the two of the holding grooves by inserting an auxiliary tool into the insertion tool, the auxiliary tool comprising pins configured to be inserted into the holding grooves of the insertion tool between the bottom surfaces of the holding grooves and the pair of side portions inserted in the two of the holding grooves after the pair of side portions of the stator coil are inserted into the two of the holding grooves of the insertion tool.

6. The stator manufacturing method according to claim 4, wherein the stator coil is wound such that coil end portions coupled to end edges of the pair of side portions form a chevron shape projecting outwardly.

* * * * *